US009325621B1

(12) United States Patent
Ramamurthy et al.

(10) Patent No.: US 9,325,621 B1
(45) Date of Patent: Apr. 26, 2016

(54) WIRELESS DEVICE OFFLOAD

(71) Applicant: Sprint Communications Company L.P., Overland Park, KS (US)

(72) Inventors: Suryanarayanan Ramamurthy, Olathe, KS (US); Talat Jamshidi, Leawood, KS (US); Rajat Kumar, Woodridge, IL (US)

(73) Assignee: Sprint Communications Company L.P., Overland Park, KS (US)

( * ) Notice: Subject to any disclaimer, the term of this patent is extended or adjusted under 35 U.S.C. 154(b) by 177 days.

(21) Appl. No.: 14/092,691

(22) Filed: Nov. 27, 2013

(51) Int. Cl.
*H04L 12/803* (2013.01)

(52) U.S. Cl.
CPC .................................... *H04L 47/125* (2013.01)

(58) Field of Classification Search
None
See application file for complete search history.

(56) References Cited

U.S. PATENT DOCUMENTS

2012/0082058 A1 4/2012 Gerstenberger et al.
2012/0230191 A1* 9/2012 Fang ..................... H04W 36/22 370/235
2013/0070594 A1* 3/2013 Garcia Martin et al. ...... 370/235
2013/0225174 A1* 8/2013 Hunukumbure .............. 455/436
2014/0003239 A1* 1/2014 Etemad ................. H04W 28/08 370/235
2014/0220967 A1* 8/2014 Pankajakshan et al. ... 455/432.1
2015/0189547 A1* 7/2015 Forssell ........................ 370/235

FOREIGN PATENT DOCUMENTS

WO 2013048096 4/2013

* cited by examiner

*Primary Examiner* — Diane Lo

(57) ABSTRACT

Examples disclosed herein provide systems, methods, and software for directing access nodes to offload users based on congestion. In one example, a method of operating a home access node includes determining that wireless usage in the home access node meets a congestion threshold. The method further includes, in response to meeting the congestion threshold, communicating an offload request to a roaming access node requesting that the roaming access node assist with serving a plurality of wireless devices. The method also includes receiving a response from the roaming access node indicating that the roaming access node can assist with serving the plurality of wireless devices, and directing at least a subset of the plurality of wireless devices to the roaming access node until an offload capacity specified by the roaming access node is reached.

20 Claims, 10 Drawing Sheets

WIRELESS DEVICE OFFLOAD

TECHNICAL FIELD

Aspects of the disclosure are related to the field of communication systems, and in particular, to directing access nodes to offload users based on congestion.

TECHNICAL BACKGROUND

Wireless communication systems typically include wireless access systems with equipment such as wireless access nodes along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

In some examples, wireless communication systems may provide communications to densely populated areas. These densely populated areas typically occur in cities, but may also occur in situations, such as large sporting events, large festivals, and other large public gatherings. As a result of these population surges, wireless communication systems may be unable to maintain support for the vast amount of users. Thus, service to the various wireless communication devices may become slow or nonexistent.

Overview

Examples disclosed herein provide systems, methods, and software for directing access nodes to offload wireless devices based on congestion. In one example, a method of operating a home access node for a home wireless network includes determining that wireless usage in the home access node meets a congestion threshold. The method further includes, in response to meeting the congestion threshold, communicating an offload request to a roaming access node for a roaming wireless network requesting that the roaming access node assist with serving a plurality of wireless devices. The method also includes receiving a response from the roaming access node indicating that the roaming access node can assist with serving the plurality of wireless devices, and directing at least a subset of the plurality of wireless devices to the roaming access node until an offload capacity specified by the roaming access node is reached. The method further provides that the home access node and the roaming access node provide wireless communications in overlapping coverage areas.

In another example, a home access node for a home wireless network includes a processing system configured to determine that wireless usage in the home access node meets a congestion threshold. The home access node further includes a communication interface configured to, in response to meeting the congestion threshold, communicate an offload request to a roaming access node for a roaming wireless network requesting that the roaming access node assist with serving a plurality of wireless devices. The communication interface is further configured to receive a response from the roaming access node indicating that the roaming access node can assist with serving the plurality of wireless devices, and direct at least a subset of the plurality of wireless devices to the roaming access node until the offload capacity specified by the roaming access node is reached.

In another instance, a method of operating a roaming access node for a roaming wireless network includes receiving an offload request from a home access node in a home wireless network requesting that the roaming access node assist with serving a plurality of wireless devices. The method also includes, in response to the offload request, determining if resources are available to communicate with at least a subset of the plurality of wireless devices, and transferring an offload response to the home access node based on availability of the roaming access node. The method further provides that the roaming access node and the home access node provide wireless communications in overlapping coverage areas.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Wireless devices rely on access nodes to send and receive data for various applications on the wireless device. These access nodes can provide a variety of wireless communication formats including Long Term Evolution (LTE), LTE Advanced, Code Division Multiple Access (CDMA), Evolution-Data Optimized (EVDO), single-carrier radio transmission technology link (1×RTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

In practice, access nodes may be built and operated by specific wireless service providers. These wireless service providers own or control all of the elements necessary to deliver services to the end user devices, including the base stations and a portion of the wireless spectrum. For each of these service providers, access nodes may be distributed geographically to ensure subscribers of the service are able to access the network in a variety of locations.

In some instances, an access node for a particular service provider may become inundated with users. Such an event may occur when there is a festival, a sporting event, or any other occasion where a large number of people are in one geographical location. As a result, new users that attempt to join the network using the access node may be unable to do so because of the lack of bandwidth available.

In the present example, instead of refusing service to new users of the access node, the access node will inquire access nodes of other service providers to determine if they are available to handle the new users. If the other service providers are unable to handle any additional users, then the access node will continue to handle the new users normally. However, if the other service providers are available to handle new users, the original access node will direct the new users to join the other access nodes in the same geographical region. Thus, instead of only supplying data connections using their own equipment, the service provider may rely on other service providers when there is a strain on the system.

Figure 1:
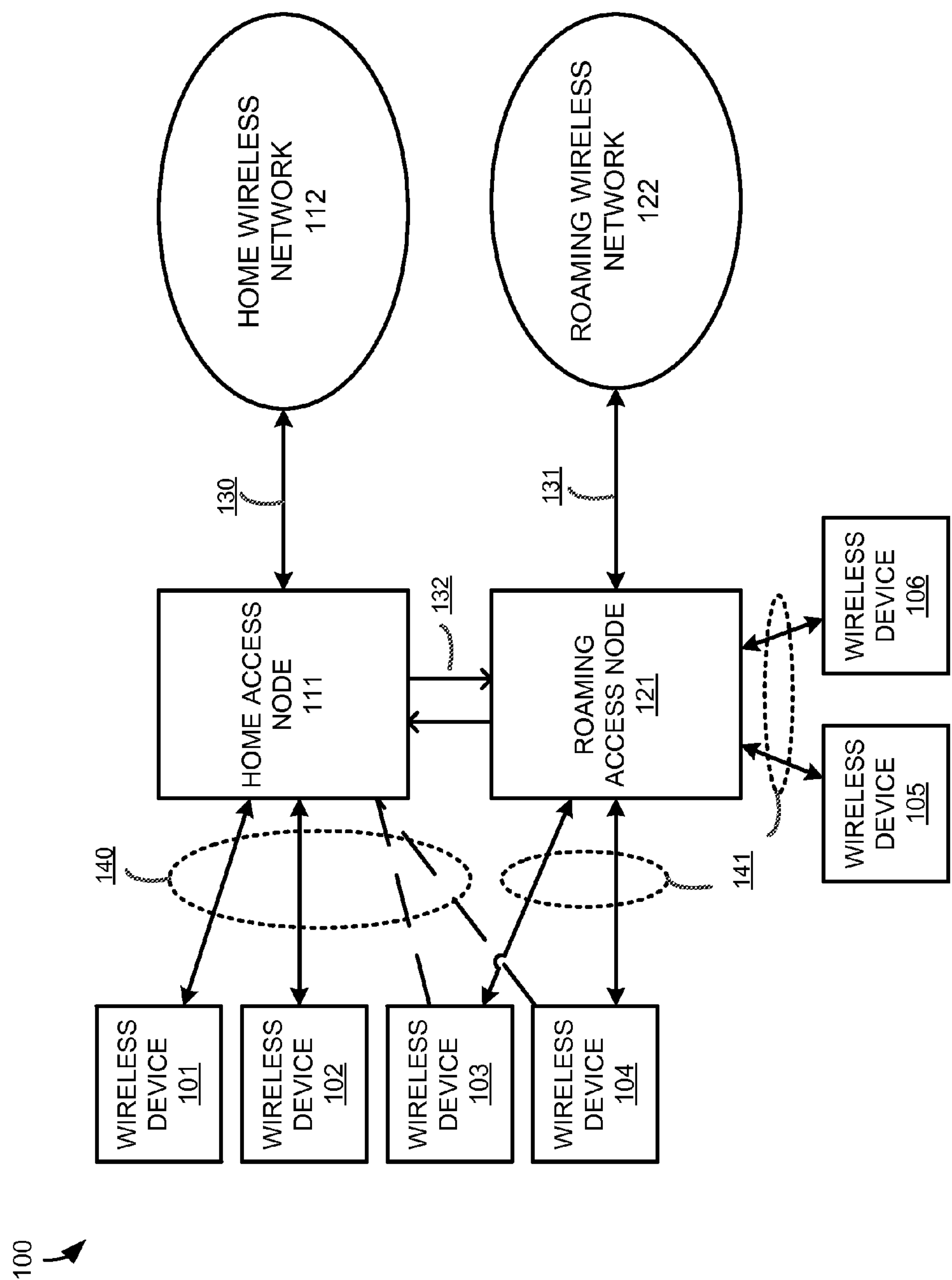
FIG. 1 illustrates a wireless communication system with the ability to offload users based on congestion.

Turning now to FIG. 1, FIG. 1 illustrates a wireless communication system 100 with the ability to offload users based on congestion. Wireless communication system 100 includes wireless devices 101-106, home access node 111, roaming access node 121, home wireless network 112, and roaming wireless network 122. Home access node 111 is used to provide a wireless communication coverage area for home wireless network 112, and may comprise an eNodeB in some examples. Home access node 111 communicates with home wireless network 112 using communication link 130 and further communicates with wireless devices using wireless sector 140. Roaming access node 121 is used to provide a wireless communication coverage area for roaming wireless network 122, and may comprise an eNodeB in some examples. Roaming access node 121 communicates with roaming wireless network 122 using communication link 131 and further communicates wireless devices using wireless sector 141. Home access node 111 and roaming access node 121 communicate using communication link 132. The coverage area for home access node 111 is configured to overlap wholly or partially with the coverage area for roaming access node 121. In the present example, a first wireless communication service provider provides home wireless network 112 and a second wireless communication service provider provides roaming wireless network 122.

In operation, wireless devices 101-106 may communicate with home access node 111 and roaming access node 121. In situations where there is little congestion, home access node 111 may be able to provide all of the communications to the users of home wireless network 112. However, if congestion at home access node 111 meets a certain threshold, then wireless devices that would typically use home access node 111 may instead use roaming access node 121.

As illustrated in wireless communication system 100, home access node 111 is congested with wireless communications. This congestion may be based on the amount of users that are connected to home access node 111, may be based on the data load of home access node 111, or may be based on a variety of other congestion factors—including combinations thereof. Upon recognition of the congestion, home access node 111 may query roaming access node 121 to determine if roaming access node 121 is available to serve additional wireless devices that would typically communicate with home access node 111. If space is available, roaming access node 121 may notify home access node 111 that resources are available on roaming access node 121. Based on this response, home access node 111 is then configured to direct wireless devices that attempt to communicate with home access node 111 to roaming access node 121.

Using the present example, home access node 111 has reached the congestion threshold and is no longer able to take on any new devices. Instead of rejecting the communication requests from wireless devices 103-104, home access node 111 is configured to direct wireless devices 103-104 to use roaming access node 121. In response to this direction, wireless devices 103-104 will begin communication using roaming access node 121.

Figure 2:
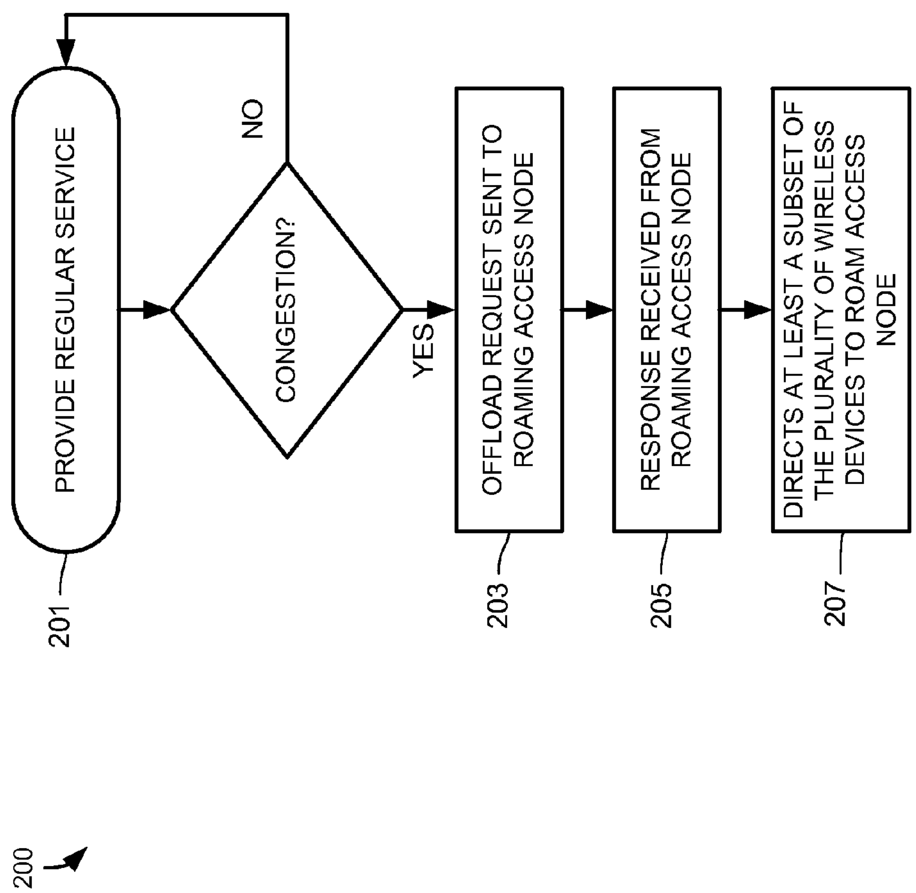
FIG. 2 illustrates a method for operating a home access node.

To further illustrate the operation of wireless communication system 100, FIG. 2 is included, which illustrates a method 200 of operating home access node 111. Method 200 includes providing regular service to wireless devices that require data communications (201). While providing this regular service, the method further includes determining if wireless usage meets a congestion threshold for home access node 111. The congestion threshold may be based on a variety of factors, including the number of users communicating using home access node 111, the data load being communicated using home access node 111, or any other factor for determining the congestion of home access node 111.

If the congestion threshold is not met for home access node 111, home access node 111 is configured to continue to provide regular service to the various wireless devices. However, if the congestion threshold is met on home access node 111, then home access node 111 may issue an offload request to roaming access node 121 (203). Roaming access node 121, which represents an access node for another service provider, will determine if there are enough resources to assist home access node 111. If no resources are available, roaming access node 121 may notify home access node 111 of the lack of resources. In contrast, if resources are available on roaming access node 121, roaming access node 121 may deliver an offload response to home access node 111 indicating the availability (205).

Based on the offload response by roaming access node 121, home access node 111 may then direct at least a subset of the wireless devices that attempt to communicate with home access node 111 to communicate using roaming access node 121 until an offload capacity is reached (207). In some instances, home access node 111 may direct the subset of the wireless devices to the roaming access node in relative succession. Thus, once the response is received from roaming access node 121, home access node 111 may offload every wireless devices that attempts to communicate until the offload capacity is attained.

In some examples, this offload capacity is included with the offload response and identifies for home access node 111 the number of guest wireless devices that can be handled by roaming access node 121. As a result, home access node 111 may keep record of the number of devices that are redirected to roaming access node 121 to ensure that the number does not exceed the offload capacity.

In other examples, rather than including an offload capacity in the offload response, home access node 111 may be configured to check with roaming access node 121 periodically to ensure that the offload capacity is not exceeded. For example, home access node 111 may check with roaming access node 121 after redirecting every device to identify when the offload capacity has been reached. Although this is one example, it should be understood that the periodic check of roaming access node 121 can be accomplished using any period, such as time, a number of user redirects, amongst other possible periods.

It should also be understood that although wireless communication system 100 is illustrated with two access nodes in the present example, wireless communication system 100 could be implemented with any number of access nodes and any number of wireless service providers. Thus, instead of simply querying a single service provider to offload wireless communications, multiple service providers could be used to decrease the load on home access node 111.

Figure 3:
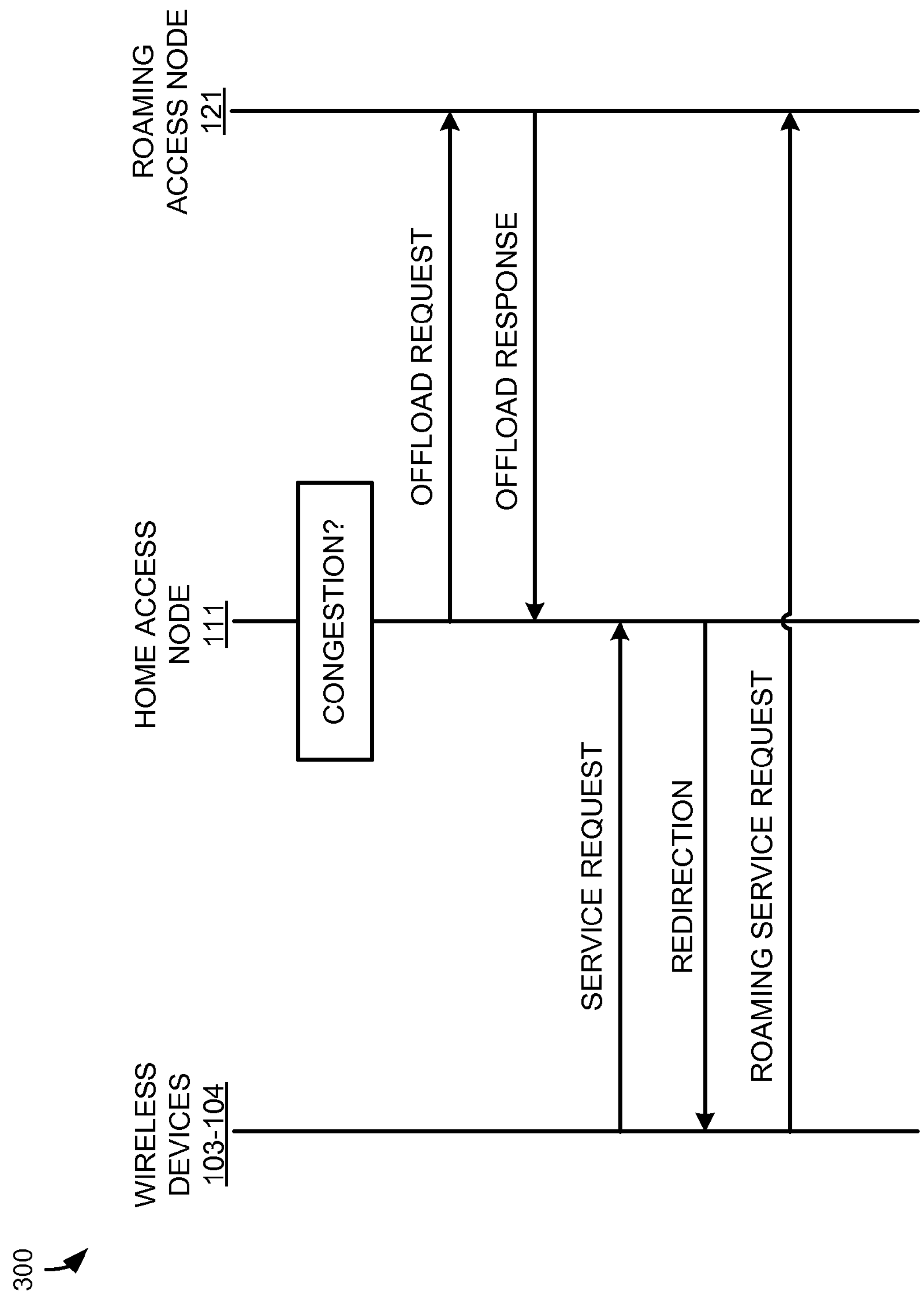
FIG. 3 illustrates a timing diagram for operating a home access node.

Referring now to FIG. 3, FIG. 3 illustrates a timing diagram 300 for operating home access node 111. Timing diagram 300 is used to demonstrate the offloading of user devices based congestion according to one example. As illustrated in timing diagram 300, home access node 111 may be configured to constantly monitor for a congestion threshold. Such a congestion threshold may be based on a number of factors, including on the number of devices that are connected to home access node 111, the data load of home access node 111, or any other congestion factor.

Once the congestion threshold is met, home access node 111 is configured to communicate an offload request to roaming access node 121. This offload request is configured to query roaming access node 121 to determine if roaming access node 121 has the capability to service wireless devices that would typically communicate with home access node 111. If roaming access node 121 does not have the ability to service any users from the home access network, roaming access node 121 may notify home access node 111 of this condition or may simply not respond to the inquiry.

In contrast, if roaming access node 121 does have the ability to service devices for home wireless network 112, then roaming access node 121 may deliver an offload response indicating the offload capacity of roaming access node 121. This offload capacity is used to identify, for home access node 111, the number of devices that can be directed to roaming access node 121. As a result, when the next wireless device seeks service from home access node 111, home access node 111 may redirect the service request to roaming access node 121. Based on this redirection, the wireless device may proceed with the data communication using roaming access node 121. Referring back to FIG. 1 as an example, once home access node 111 determines that there is enough congestion, home access node 111 may refer wireless devices 103-104 to roaming access node 121 in relative succession until the offload capacity has been reached.

Once a wireless device is passed from home access node 111 to roaming access node 121, home access node 111 is configured to monitor the number of devices that are redirected. By monitoring the number of devices that are redirected, home access node 111 can ensure that the offload capacity from roaming access node 121 is not exceeded.

Figure 4:
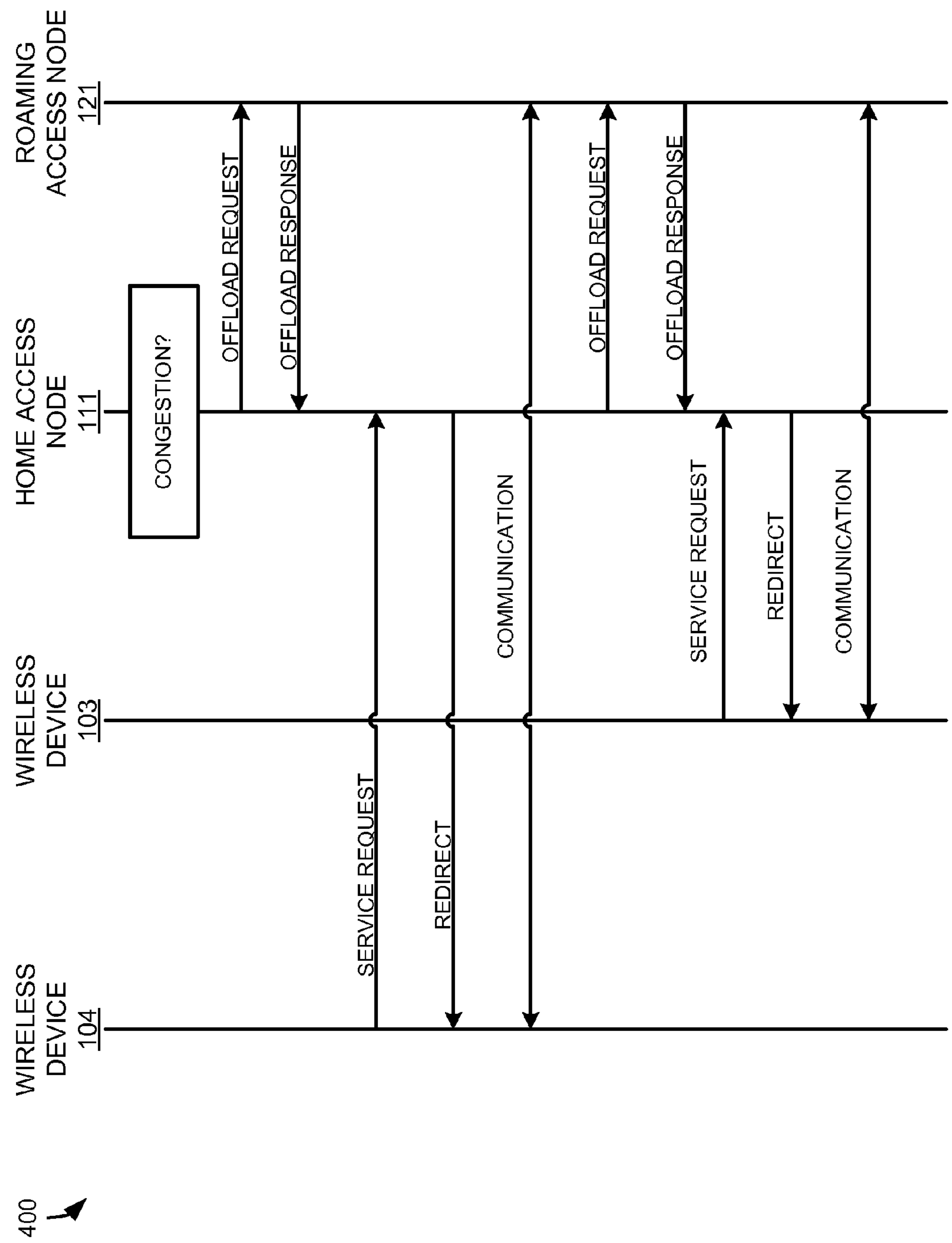
FIG. 4 illustrates a timing diagram for operating a home access node.

FIG. 4 illustrates a timing diagram 400 for operating home access node 111 according to one example. As illustrated in timing diagram 400, home access node 111 is configured to determine a congestion threshold that is based on the wireless load on the system. This congestion threshold may be based on a variety of factors, including the number of users connected to home access node 111, the amount of data being communicated through home access node 111, or any other congestion factors.

Once the congestion threshold has been identified, home access node 111 will generate an offload request for roaming access node 121. In response to this request, roaming access node 121 will determine if there are enough resources to service both the devices that would typically connect to access node 121 as well as the extra devices that would typically connect to home access node 111. If roaming access node 121 determines that there are enough resources, then roaming access node 121 will deliver an offload response to home access node 111.

In the present example, the offload request and the offload response are periodically executed. As illustrated in timing diagram 400, the offload response from roaming access node 121 allows a single wireless device to be redirected. Once this redirection occurs, home access node 111 and roaming access node 121 will have to continually execute another offload request to redirect another wireless device until the offload capacity is reached. Although allowing the redirection of a single wireless device is illustrated in the present example, it should be understood that the periodic requests could occur after any number of wireless devices are redirected. Further, before any additional offload requests are sent, the congestion threshold may be continuously monitored. If the congestion threshold is no longer met, then home access node 111 may resume normal operations with connected devices. However, if the congestion threshold continues to be met, another offload request will be delivered to roaming access node 121.

Figure 5:
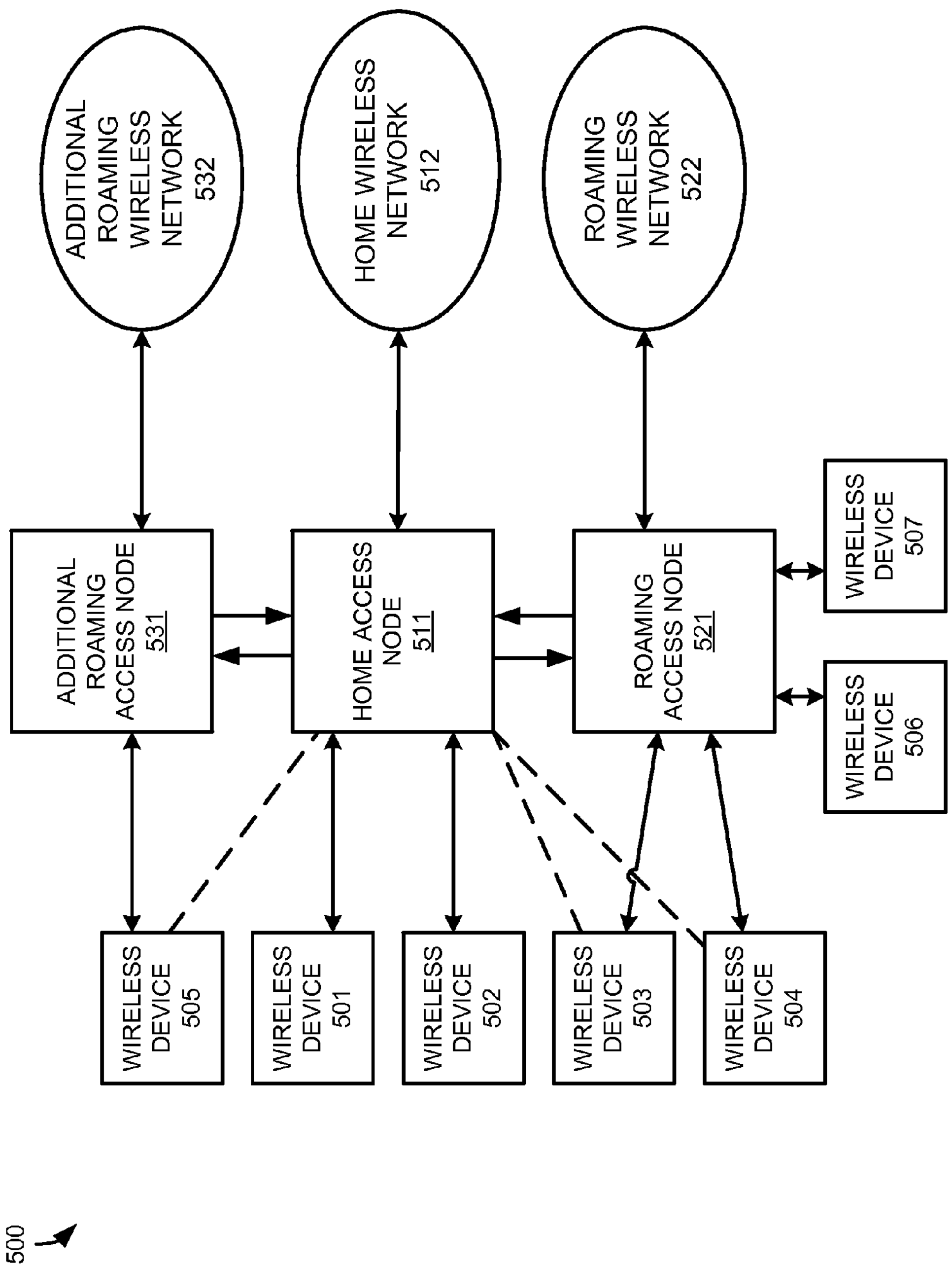
FIG. 5 illustrates a wireless communication system with the ability to offload users based on congestion.

Turning now to FIG. 5, FIG. 5 illustrates a wireless communication system 500 with the ability to offload users based on congestion. Wireless communication system 500 includes wireless device 501-507, home access node 511, home wireless network 512, roaming access node 521, roaming wireless network 522, additional roaming access node 531, and additional roaming wireless network 532. Wireless networks 512, 522, and 532 represent wireless networks provided by different wireless service providers. Access nodes 511, 521, and 531 represent various wireless network access points such as base stations, eNodeBs, or other wireless access points. These access nodes provide at least partially overlapping coverage areas to wireless communication devices 501-507.

In operation, wireless communication system 500 is configured operate similarly to wireless communication system 100 in FIG. 1. Home access node 511 is configured to determine whether wireless usage at home access node 511 meets a congestion threshold. The congestion threshold may be based on the number of users using home access node 511, the data load on home access node 511, amongst other possible wireless usage statistics—including combinations thereof. Once the threshold has been satisfied, home access node 511 is then configured to deliver an offload request to roaming access node 521 and additional roaming access node 531. The roaming access nodes will then determine if they are available to service guest devices for home wireless network 512, and respond to home access node 511 with offload responses.

Next, based on the offload responses, home access node 511 is configured to direct one or more of the devices that would typically connect using wireless network 512 to use the roaming wireless networks. Using the example in FIG. 5, wireless devices 503-505 are attempting to communicate with home access node 511 while the node is congested. As a result, wireless devices 503-505 are directed to communicate using the corresponding roaming access nodes.

In some examples, the offload responses include offload capacities that are used to define the number of guest wireless devices that the roaming access nodes are capable of supporting. As a result, home access node 511 may maintain a record of the number of redirected devices and compare this number to the offload capacity to ensure that the offload capacity is not exceed for the roaming access nodes.

In other instances, home access node 511 may be configured to communicate with the roaming access nodes periodically to determine the offload capacity. For example, home access node 511 may check with the roaming access nodes after every redirected device to ensure that there is still capacity for more guest devices. Alternatively, home access node 511 may make periodic offload capacity checks based on time, or any other periodic method.

Although illustrated in the present example with three wireless networks, it should be understood that system 500 may employ any number of wireless networks from any number of wireless service providers.

Figure 6:
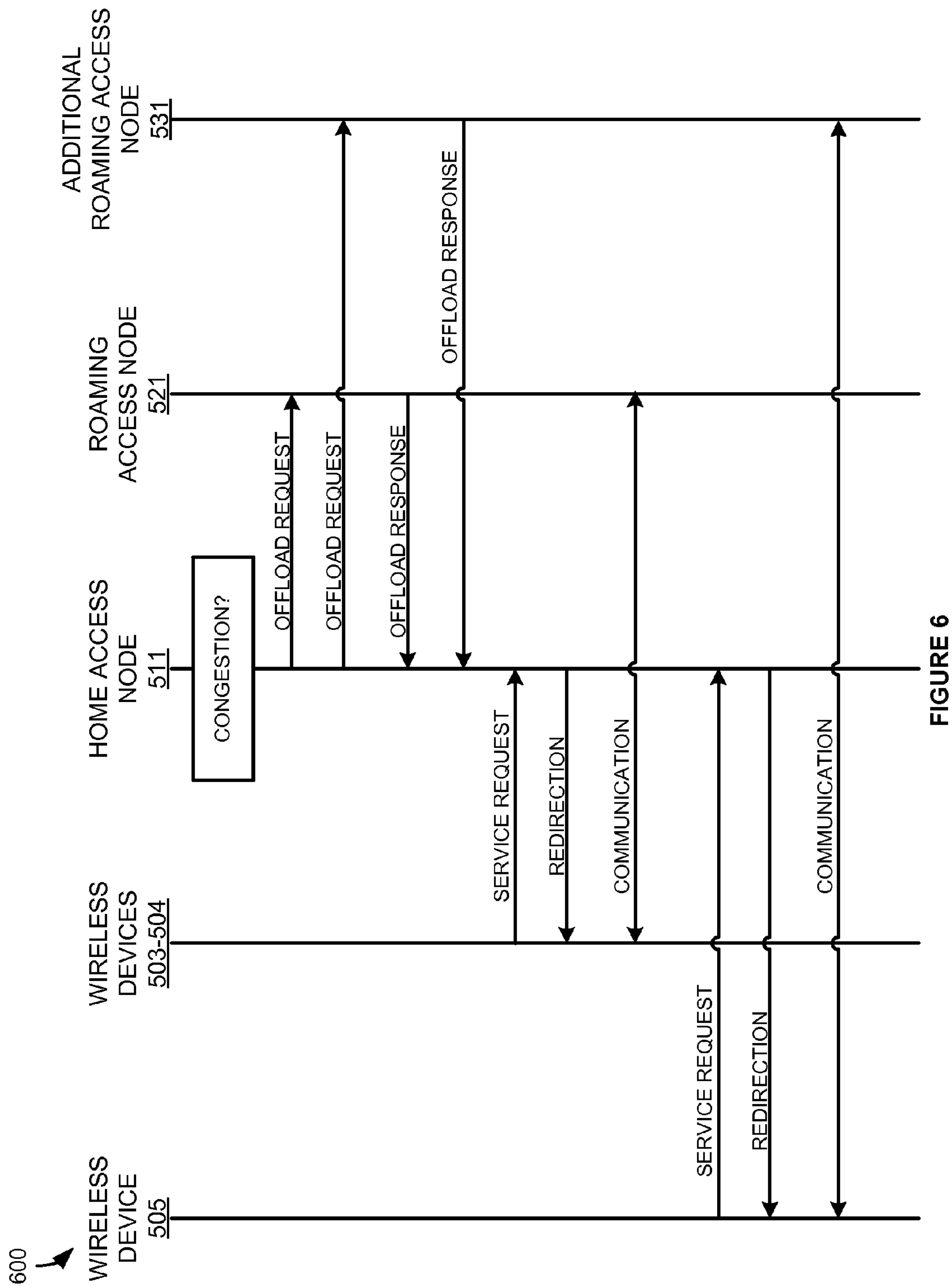
FIG. 6 illustrates a timing diagram for operating a home access node.

FIG. 6 illustrates a timing diagram 600 for operating a home access node according to one example. As illustrated in timing diagram 600, home access node 511 is configured to monitor for wireless usage congestion at the node. This congestion may be based on the number of users of home access node 511, the amount of data being transferred through home access node 511, or any other congestion factor. Once the congestion reaches a congestion threshold, which may be based on any combination of the aforementioned factors, home access node 511 is configured to issue an offload request to roaming access node 521 and additional roaming access node 531. Based on this offload request, the roaming access nodes are configured to determine an offload capacity and deliver an offload response to home access node 511. The offload capacity is the number of additional mobile devices that can be handled by the roaming access nodes that would normally be handled by home access node 511.

Once the offload capacity has been received by home access node 511, home access node 511 is then configured to direct wireless devices to the roaming access nodes in relative succession. In the present example, wireless devices 503-505 are attempting to communicate with congested home access node 511. As a result of the offload capacities, wireless devices 503-504 are directed to roaming access node 521, and wireless device 505 is directed to additional roaming access node 531.

After the devices have been redirected to the appropriate roaming access node, home access node 511 is configured to keep track of the number of devices that it redirects. By keeping track of the number of devices that are redirected, home access node 511 is able to ensure that it does not exceed the offload capacity for the roaming access nodes. Instead, once the entire offload capacity has been used for a roaming access node, home access node 511 will process the data requests normally or push the request to another available roaming access node.

In some examples, once the offload capacity has been reached for a roaming access node, home access node 511 may query the roaming access node again to determine if more space has become available. Additionally, home access node 511 may cease directing wireless devices to alternative access nodes once the congestion at home access node 511 drops below a certain threshold.

Figure 7:
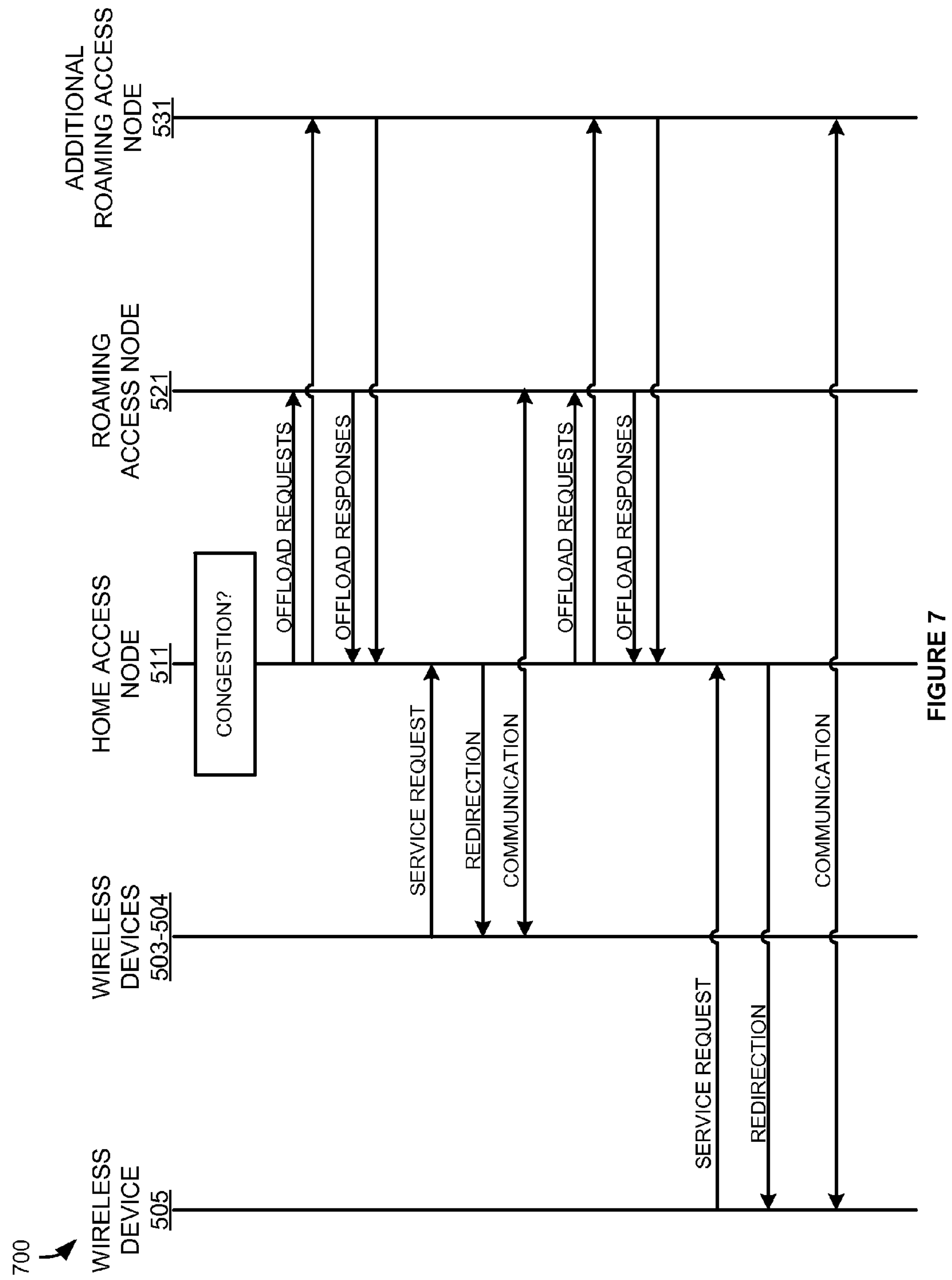
FIG. 7 illustrates a timing diagram for operating a home access node.

Turning now to FIG. 7, FIG. 7 illustrates an alternative timing diagram 700 for operating home access node 511. As depicted in FIG. 7, home access node 511 is configured to monitor wireless usage congestion from wireless devices connecting to home access node 511. Congestion could be monitored based on the number of users connecting to home access node 511, the amount of data being passed through home access node 511, a signal to noise ratio at home access node 511, or any other congestion factor. Once congestion reaches a congestion threshold, which may be based on any combination of the previously mentioned factors, home access node 511 is configured to issue offload requests to roaming access node 521 and additional roaming access node 531. Based on these offload requests, roaming access node 521 and additional roaming access node 531 are configured to determine their availability to serve guest wireless devices and to respond with an offload response.

In the present example, the offload requests are configured to be sent periodically allowing the roaming access nodes to diagnose the capacity for guest wireless devices more frequently. For example, using timing diagram 700 as an example, home access node 511 will make a first offload request before redirecting wireless devices 503-504 to roaming access node 521. Following this redirection, home access node 511 will make another offload request to roaming access node 521 and additional roaming access node 531. Based on the offload responses, home access node 511 will then redirect wireless device 505 to communicate using additional roaming access node 531.

In some examples, the periodic offload requests may be sent on a given time period such as every few minutes, may be sent out after a certain amount of devices are redirected, or may be sent out at any other periodic interval. By periodically checking the availability of the roaming access node, the roaming access nodes are able to constantly monitor their own offload capacity. Further, it should be understood that although the offload requests for roaming access node 521 and additional roaming access node 531 are made at the same instance in the present example, the offload requests may be offset in some examples. Thus, home access node 511 may query roaming access node 521 until the offload capacity is reached, then may begin querying additional roaming access node 531.

Figure 8:
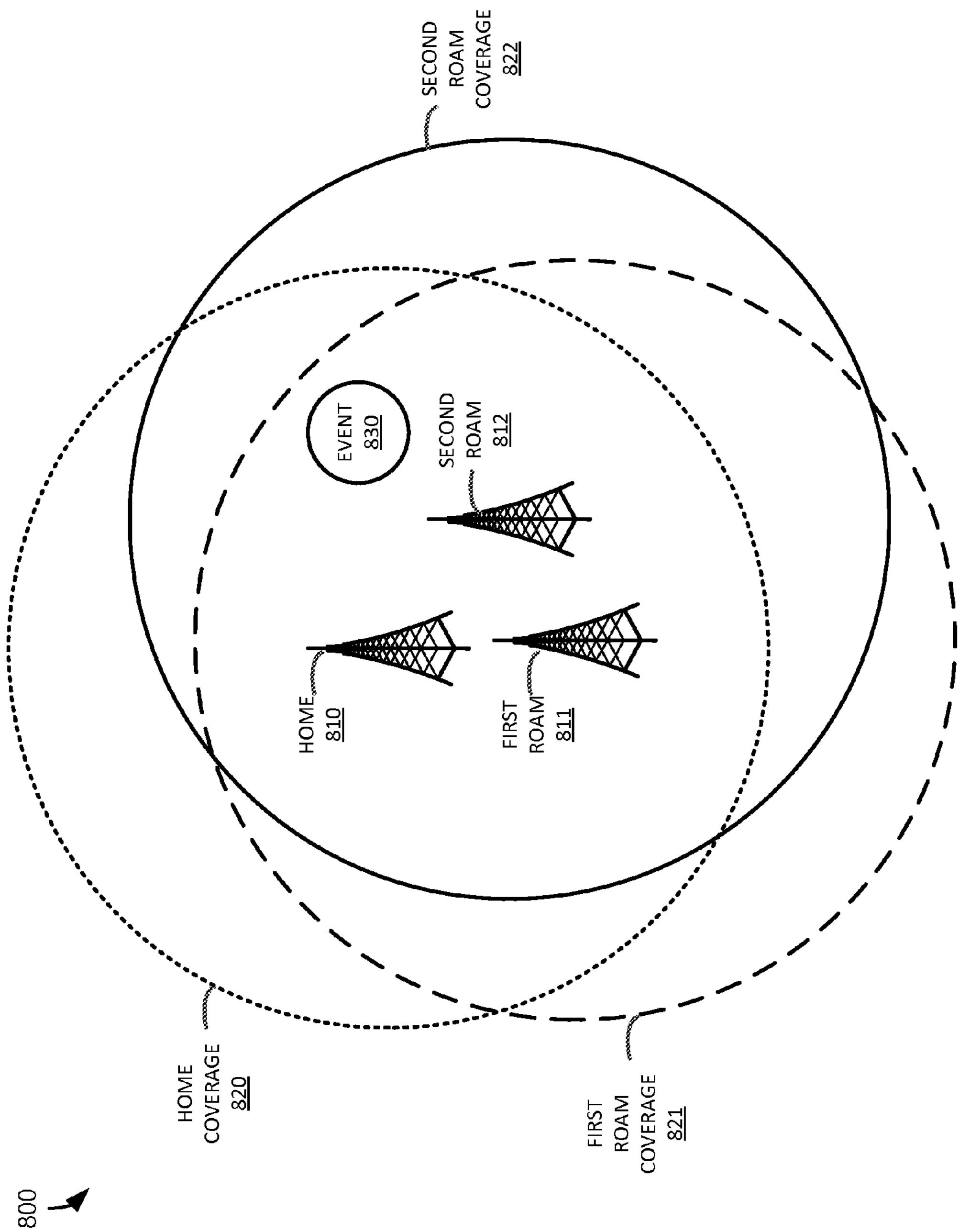
FIG. 8 illustrates a coverage area overview for a plurality of access nodes.

Moving now to FIG. 8, FIG. 8 provides a coverage area overview 800 for a plurality of access nodes. Overview 800 includes access nodes 810-812, coverage areas 820-822, and event 830. In operation, access nodes 810-812 are used to provide wireless communications to various wireless communication devices. Home access node 810 provides home coverage area 820, first roaming access node 811 provides first roaming coverage area 811, and second roaming access node 812 provides second roaming coverage area 822.

As depicted in overview 800, event 830 is occurring within all of the coverage areas. Event 830 may include a sporting event, a festival, a densely populated area in a city, or any other event where a large amount of wireless devices are densely populated. In operation, home access node 810 is configured to monitor for congestion from wireless usage. Once the congestion reaches a congestion threshold, home access node 810 is then configured to contact first roaming access node 811 and second roaming access node 812 with an offload request. These contactable access nodes may be preconfigured in some examples based on their location in proximity event 830 or may be configured based on any overlap in coverage area. For example, using overview 800, first roaming access node 811 and second roaming access node 812 are both capable of serving wireless devices for event 830.

Upon the receipt of the offload request, the roaming access nodes are configured to determine their availability to serve guest wireless devices from home access node 811. If they are available, the roaming access nodes will deliver an offload response to home access node 810, which will then redirect at least a portion of a plurality of devices to the roaming access nodes when they attempt to communicate.

Figure 9:
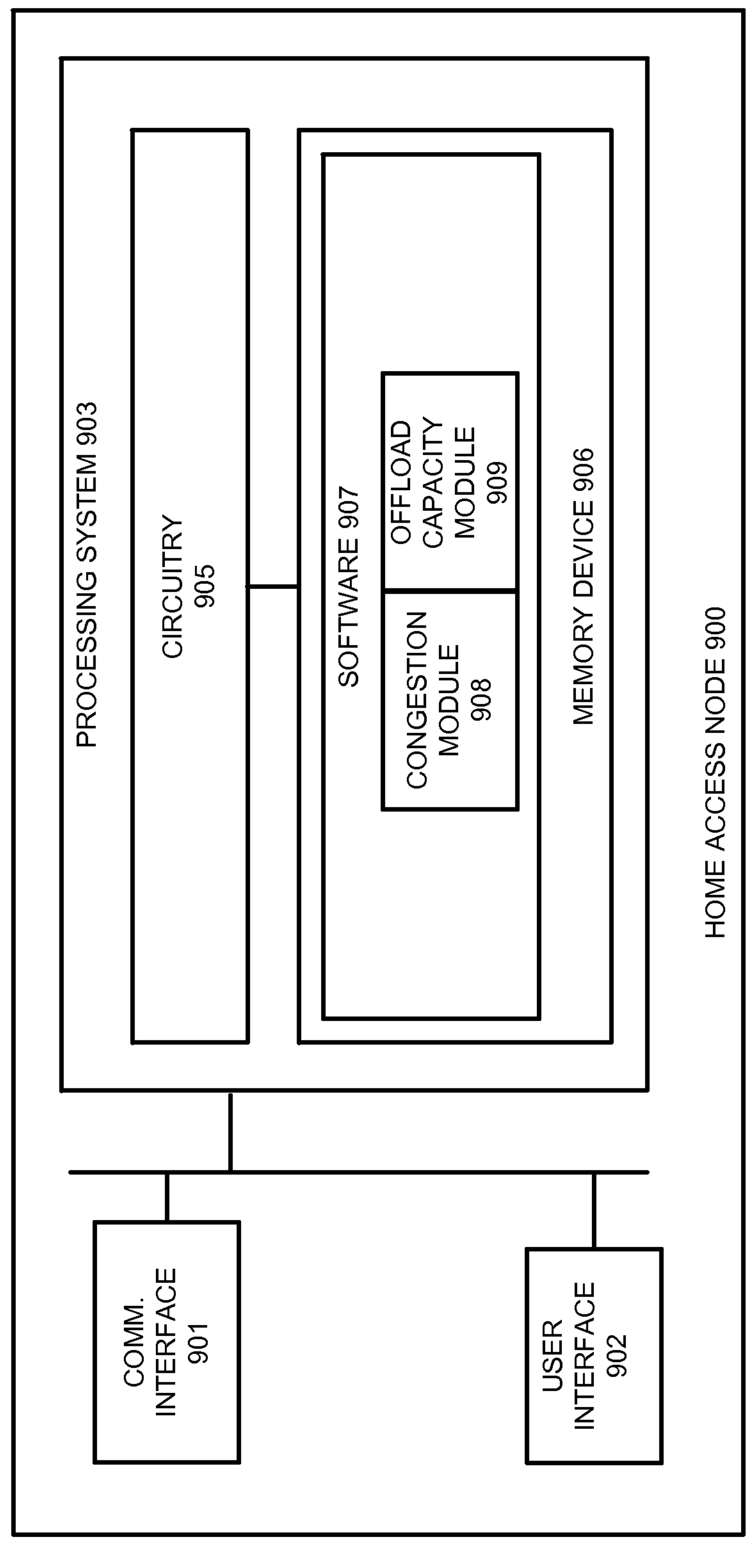
FIG. 9 illustrates a home access node computing system.

Referring now to FIG. 9, FIG. 9 illustrates a home access node 900 according to one example. Home access node 900 is an example of home access node 111 and home access node 511, although other examples may exist. In some examples, home access node 900 may comprise an eNodeB configured to communicate with wireless devices using Long Term Evolution (LTE) communication format. Home access node 900 includes communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof. The wireless protocols may include Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format, including combinations, variations, or improvements thereof. Communication interface 901 is configured to facilitate data communications to various wireless devices. These data communications may include connections with other wireless devices, connections with the internet, or any other data communication. Further, communication interface 901 is configured to communicate with other access nodes when a congestion threshold is met for home access node 901. These other access nodes may provide coverage to at least a portion of the coverage area provided by home access node 901, but the nodes may belong to another wireless service provider.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes congestion module 908 and offload capacity module 909. Operating software 907 may include an operating system, utilities, drivers, network interfaces, applications, or some other type of software. When executed by circuitry 905, operating software 907, which includes congestion module 908 and offload capacity module 909, direct processing system 903 to operate home access node 900 as described herein.

In particular, congestion module 908 is configured to measure congestion from wireless usage. This congestion measurement may include a number of factors, including a number of users connecting to home access node 900, an amount of data being passed through home access node 900, amongst other possible congestion factors. Once the congestion reaches a threshold level, home access node 900 is then configured to use communication interface 901 to contact roaming access nodes to determine their availability to assist in the congestion. These roaming access nodes will then return an offload response to home access node 900, and home access node 900 may direct one or more wireless devices to communicate with the roaming access nodes.

In some examples, an offload capacity specified by the roaming access nodes may be monitored by offload capacity module 909. Offload capacity module 909 is configured to ensure that home access node 900 only directs as many devices to the roaming nodes as allowed by the offload capacity. Thus, for example, if the offload capacity is ten wireless devices for a particular roaming access node, offload capacity module 909 will ensure that ten or less devices are directed to that particular roaming node. Once the offload capacity is reached, in some instances, home access node 900 may inquire the roaming access nodes if any more space has been freed up.

In other examples, home access node 900 may periodically check with the roaming nodes to determine the offload capacity. For instance, home access node 900 may be configured to inquire roaming access nodes to determine if space is available, redirect one or more devices to the roaming access nodes, and then inquire the roaming access nodes again based on the periodic schedule. In some examples, this periodic schedule may be based on the directed user devices. For instance, home access node 900 may inquire the roaming access nodes after every redirected wireless device to determine if there are more resources available. In other examples, home access node 900 may check the availability of the roaming access nodes on a time schedule, such as every minute or any other timing schedule.

Although illustrated in the present example with two software modules, it should be understood that home access node 900 may be implemented using any number of software modules.

Figure 10:
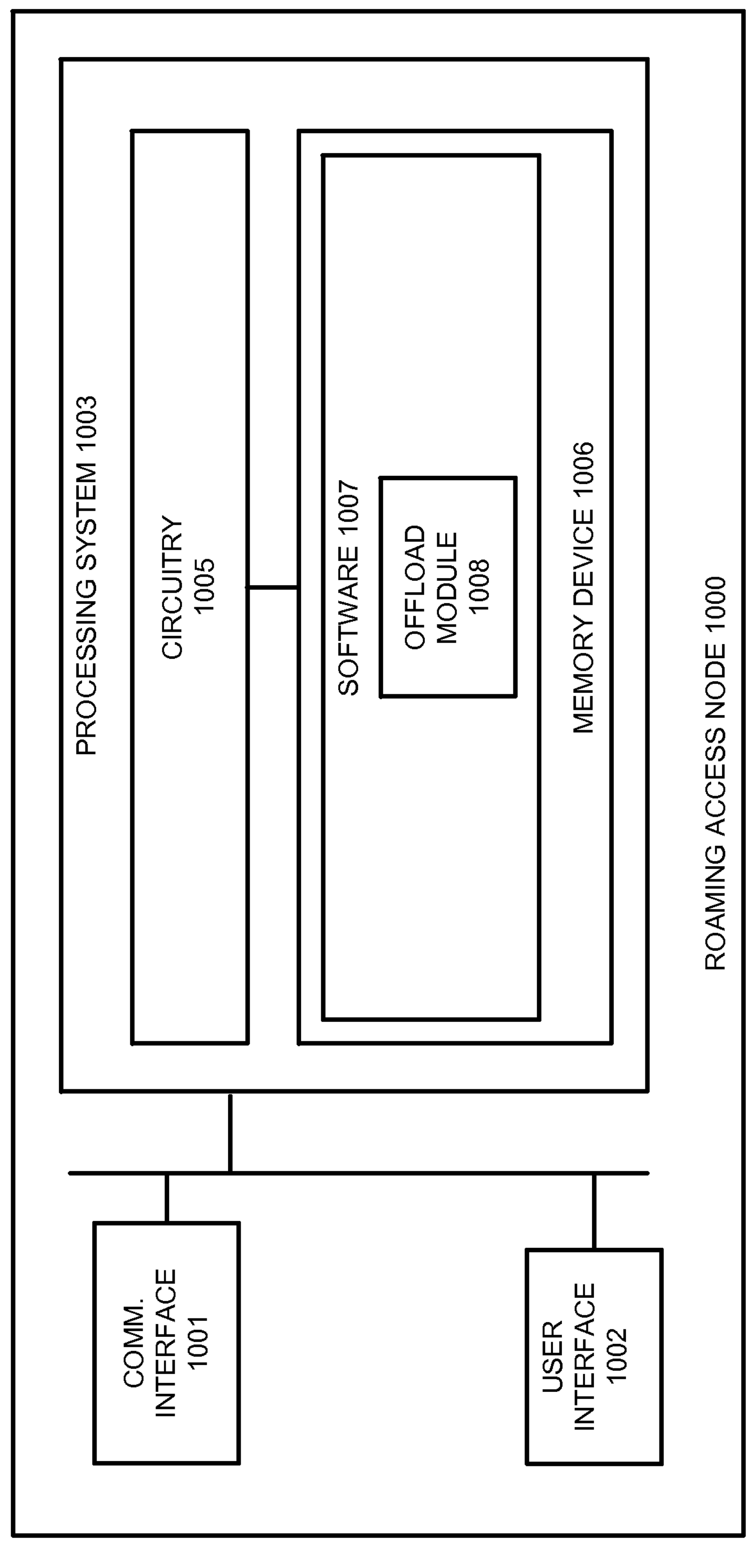
FIG. 10 illustrates a roaming access node computing system.

FIG. 10 illustrates a roaming access node 1000 according to one example. Roaming access node 1000 is an example of roaming access node 121, roaming access node 521, and additional roaming access node 531. In some examples, roaming access node 1000 may comprise an eNodeB configured to communicate with wireless devices using Long Term Evolution (LTE) communication format. Roaming access node 1000 includes communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof. The wireless protocols may include Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format, including combinations, variations, or improvements thereof. Communication interface 1001 is configured to facilitate data communications to various wireless devices. These data communications may include connections with other wireless devices, connections with the internet, or any other data communication. Further, communication interface 1001 is configured to receive an offload request from a home access node, and respond based on the availability of roaming access node 1000 to serve guest wireless devices.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes offload module 1008. Operating software 1007 may include an operating system, utilities, drivers, network interfaces, applications, or some other type of software. When executed by circuitry 1005, operating software 1007, which includes offload module 1008, directs processing system 1003 to operate roaming access node 1000 as described herein.

In particular, communication interface 1001 is configured to receive an offload request from a home access node that is part of a different wireless communication network. This offload request inquires roaming access node 1000 to determine if there are any available resources to handle guest wireless devices that would typically communicate with the home access node. Once the offload request is received, offload module 1008 is configured to determine if roaming access node 1000 has resources available to help the home access node. Once the help determination is made, communication interface 1001 is configured to return an offload response to the home access module.

In some examples, the offload response may indicate an offload capacity of the number of devices that can be passed to roaming access node 1000. In other examples, the offload response may be based on a periodic schedule that is based on a number of redirected devices or a time constraint. For instance, roaming access node 1000 may have to be checked for every device that is going to be forwarded to it. Thus, the home access node may have to continually check the availability of roaming access node 1000.

Although illustrated with one software module in the present example, it should be understood that roaming access node 1000 may be implemented with any number of software modules.

Returning now to FIG. 1, home wireless network 112 and roaming wireless network 122 comprise network elements that provide communication services to wireless communication devices 101-106 using home access node 111 and roaming access node 121. The wireless networks may comprise switches, wireless access nodes, Internet routers, network gateways, application servers, computer systems, communication links, or some other type of communication equipment—including combinations thereof.

Access nodes 111 and 121 comprise at least Radio Frequency (RF) communication circuitry and an antenna. The RF communication circuitry typically includes an amplifier, filter, RF modulator, and signal processing circuitry. Access nodes 111 and 121 may also comprise a router, server, memory device, software, processing circuitry, cabling, power supply, network communication interface, structural support, or some other communication apparatus. Access nodes 111 and 121 may comprise eNodeBs in some examples.

Wireless devices 101-106 comprise RF communication circuitry and an antenna. The RF communication circuitry typically includes an amplifier, filter, modulator, and signal processing circuitry. Wireless devices 101-106 may also include a user interface, memory device, software, processing circuitry, or some other communication components. Each of wireless devices 101-106 may be a telephone, computer, e-book, mobile Internet appliance, wireless network interface card, media player, game console, or some other wireless communication apparatus—including combinations thereof.

Wireless sectors 140-141 include wireless links that use the air or space as a transport media. These wireless links may communicate using Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Communication links 130-132 use metal, glass, air, space, or some other material as the transport media. Communication links 130-132 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 130-132 could be direct links or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a home access node for a home wireless network comprising:

determining that wireless usage in the home access node meets a congestion threshold;

in response to meeting the congestion threshold, communicating an offload request to a roaming access node for a roaming wireless network requesting that the roaming access node assist with serving a plurality of wireless devices;

receiving a response from the roaming access node indicating that the roaming access node can assist with serving the plurality of wireless devices; and directing at least a subset of the plurality of wireless devices to the roaming access node until an offload capacity specified by the roaming access node is reached;

wherein the home access node and the roaming access node provide wireless communications in overlapping coverage areas.

2. The method of claim 1 wherein directing at least the subset of the plurality of wireless devices to the roaming access node comprises directing at least the subset of the plurality of wireless devices to the roaming access node in relative succession.

3. The method of claim 2 further comprising determining, after each of the plurality of wireless devices are directed to the roaming access node, whether the offload capacity specified by the roaming access node is reached.

4. The method of claim 2 further comprising transferring, after each of the plurality of wireless devices are directed to the roaming access node, a query to the roaming access node to determine whether the offload capacity specified by the roaming access node is reached.

5. The method of claim 1 further comprising:

in response to meeting the congestion threshold, communicating an additional offload request to an additional roaming access node for an additional roaming wireless network requesting that the additional roaming access node assist with serving the plurality of wireless devices;

receiving an additional response from the additional roaming access node indicating that the additional roaming access node can assist with serving the plurality of wireless devices; and directing at least an additional subset of the plurality of wireless devices to the additional roaming access node until an additional offload capacity specified by the additional roaming access node is reached.

6. The method of claim 5 wherein the home access node and the additional roaming access node provide wireless communications in overlapping coverage areas.

7. The method of claim 5 wherein communicating the additional offload request to the additional roaming access node occurs after the offload capacity specified by the roaming access node is reached.

8. The method of claim 1 wherein the offload capacity comprises a number of allotted guest wireless devices for the roaming access node.

9. The method of claim 1 wherein the home access node and the roaming access node comprise eNodeBs.

10. A home access node for a home wireless network comprising:

a processing system configured to:

determine that wireless usage in the home access node meets a congestion threshold; and a communication interface configured to:

in response to meeting the congestion threshold, communicate an offload request to a roaming access node for a roaming wireless network requesting that the roaming access node assist with serving a plurality of wireless devices;

receive a response from the roaming access node indicating that the roaming access node can assist with serving the plurality of wireless devices; and direct at least a subset of the plurality of wireless devices to the roaming access node until the offload capacity specified by the roaming access node is reached.

11. The method of claim 10 wherein the home access node and the roaming access node provide wireless communications in overlapping coverage areas.

12. The home access node of claim 10 wherein the processing system is further configured to:

determine, after each of the plurality of wireless devices are directed to the roaming access node, whether the offload capacity specified by the roaming access node is reached.

13. The home access node of claim 10 wherein the communication interface is further configured to:

transfer, after each of the plurality of wireless devices are directed to the roaming access node, a query to the roaming access node to determine whether the offload capacity specified by the roaming access node is reached.

14. The home access node of claim 10 wherein the communication interface is further configured to:

in response to meeting the congestion threshold, communicate an additional offload request to an additional roaming access node for an additional roaming wireless network requesting that the additional roaming access node assist with serving the plurality of wireless devices;

receive an additional response from the additional roaming access node indicating that the additional roaming access node can assist with serving the plurality of wireless devices; and direct at least an additional subset of the plurality of wireless devices to the additional roaming access node until an additional offload capacity specified by the additional roaming access node is reached.

15. The home access node of claim 14 wherein the home access node and the additional roaming access node provide wireless communications in overlapping coverage areas.

16. The home access node of claim 14 wherein the communication interface configured to communicate the additional offload request to the additional roaming access node is configured to communicate the additional offload request to the additional roaming access node after the offload capacity specified by the roaming access node is reached.

17. The home access node of claim 14 wherein the offload capacity comprises a number of allotted guest wireless devices for the roaming access node.

18. A method of operating a roaming access node for a roaming wireless network comprising:

receiving an offload request from a home access node in a home wireless network requesting that the roaming access node assist with serving a plurality of wireless devices;

in response to the offload request, determining if resources are available to communicate with at least a subset of the plurality of wireless devices; and transferring an offload response to the home access node based on availability of the roaming access node;

wherein the roaming access node and the home access node provide wireless communications in overlapping coverage areas.

19. The method of claim 18 wherein the offload response comprises at least an offload capacity.

20. The method of claim 19 wherein the offload capacity comprises a number of allotted guest wireless devices for the roaming access node.

* * * * *